No. 881,916. PATENTED MAR. 17, 1908.
H. A. FARRAND.
PICTURE DISPLAY MACHINE.
APPLICATION FILED MAR. 8, 1906.
2 SHEETS—SHEET 1.
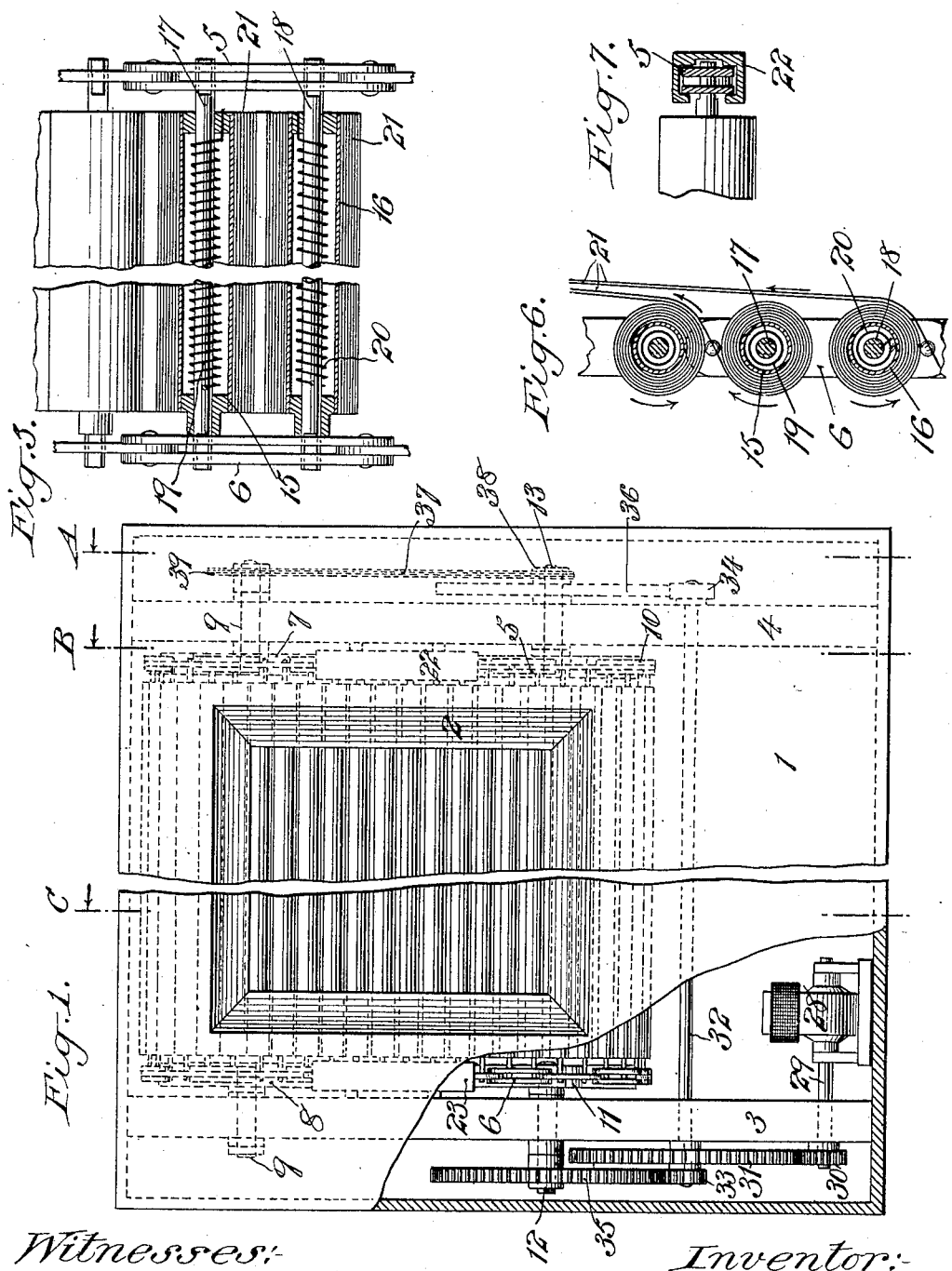
Witnesses:-
F. George Barry
Henry Thieme
Inventor:-
Hiram A. Farrand
by attorneys
Brown & Seward No. 881,916. PATENTED MAR. 17, 1908.
H. A. FARRAND.
PICTURE DISPLAY MACHINE.
APPLICATION FILED MAR. 8, 1906.
2 SHEETS—SHEET 2.
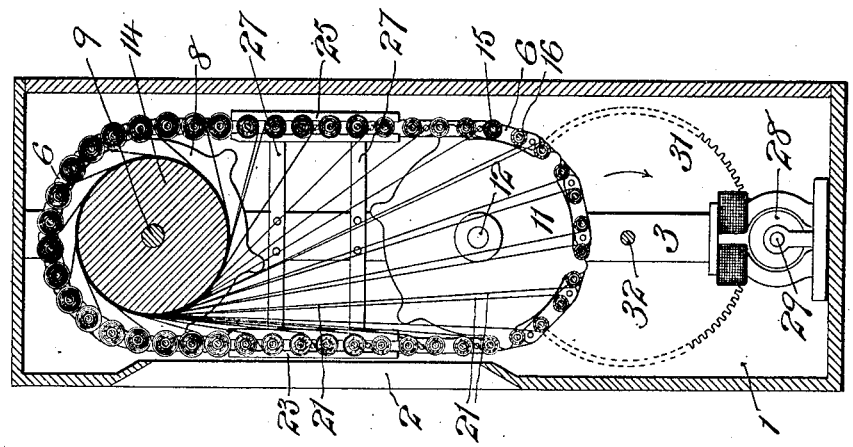
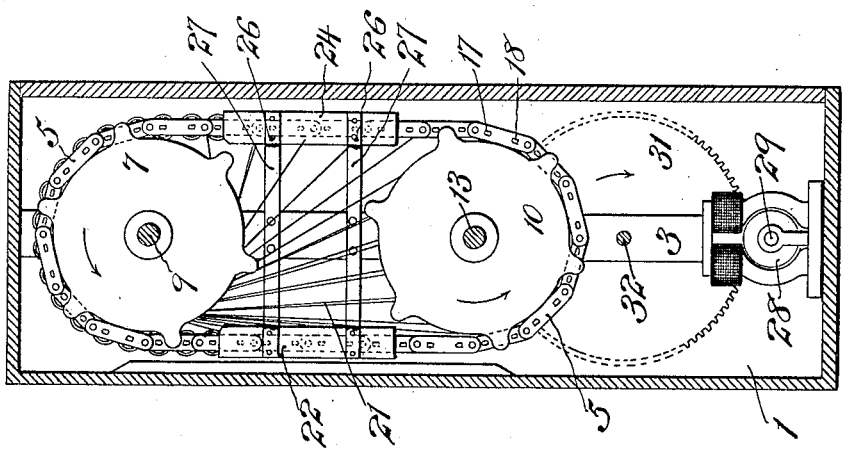
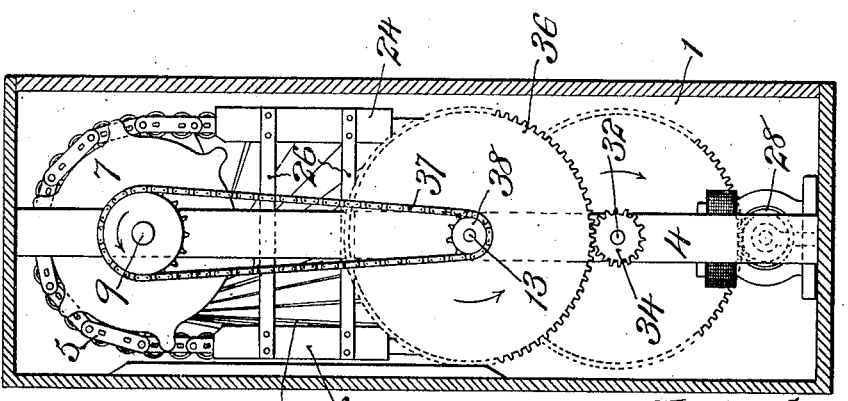
Witnesses:
F. George Barry,
Henry Thieme.
Inventor:
Hiram A. Farrand
by attorneys
Brown Seward

UNITED STATES PATENT OFFICE.

HIRAM A. FARRAND, OF NEW YORK, N. Y., ASSIGNOR TO THE KINETOPLANE DISPLAY COMPANY, OF NEW YORK, N. Y., A CORPORATION OF NEW YORK.

PICTURE-DISPLAY MACHINE.

No. 881,916.   Specification of Letters Patent.   Patented March 17, 1908.

Application filed March 8, 1906. Serial No. 304,844.

*To all whom it may concern:*

Be it known that I, HIRAM A. FARRAND, a citizen of the United States, and resident of the borough of Manhattan, in the city and State of New York, have invented a new and useful Picture-Display Machine, of which the following is a specification.

My invention consists in a picture display machine in which a plurality of picture display surfaces are arranged to travel in a common path and means are provided for moving the surfaces along the said path whereby different portions of several surfaces are displayed at the same time in the picture plane.

My invention further consists in providing means for causing the surfaces to travel in an endless path into and out of the picture plane thus obviating the necessity of reversing the driving mechanism.

This picture display machine is applicable for use in presenting moving pictures or successive stationary pictures or a combination of the two, as may be found desirable.

In the accompanying drawings, Figure 1 represents the machine in front elevation, the middle portion being broken away to bring the side portions more closely together and a part of the front of the casing being broken away for showing the driving mechanism, Fig. 2 is a vertical section from front to rear taken in the plane of the line A—A of Fig. 1, looking in the direction of the arrows, Fig. 3 is a similar view taken in the line B—B of Fig. 1 looking in the direction of the arrows, Fig. 4 is a similar view taken in the plane of the line C—C of Fig. 1 looking in the direction of the arrows, Fig. 5 is an enlarged detail view showing the arrangement of the apron reels, two of the said reels being shown in section, Fig. 6 is a detail section through the apron reels and their adjacent parts, and Fig. 7 is a detail view showing one of the guides which receive apron reel carrying chains for the purpose of insuring an even picture plane.

The box or casing of the machine is denoted by 1 and is provided in its front with a picture display window 2 of the desired shape and size. Two vertical side frames 3 and 4 are located within the casing 1. Apron reel carrying chains 5 and 6 are fitted to travel around sprocket wheels 7 and 8 loosely mounted on the rotary upper cross shaft 9 and also around sprocket wheels 10 and 11 fixed to lower rotary stud shafts 12, 13. The upper cross shaft 9 is mounted in suitable bearings in the vertical side frames 3 and 4 and the lower stud shafts 12 and 13 are also mounted in suitable bearings in the side frames. A support 14, which is represented in the accompanying drawing as a cylinder or drum, is fixed to rotate with the shaft 9 and is located between the sprocket wheels 7 and 8. A continuous series of spring actuated apron reels 15, 16, which reels are herein shown as rolls, are loosely mounted on rods 17, 18, carried by the chains 5, 6. The springs 19, 20, of the pairs of reels 15, 16, are wound in opposite directions and are attached at their ends respectively to the rods 17, 18, and the reels 15, 16. Aprons 21 are wound upon the reels and have their outer ends permanently secured successively to a support separate from the reels; in the present instance, the rotary support 14.

In the accompanying drawings I have shown each pair of apron reels 15, 16, as carried by one link on each chain. Front side guides 22, 23, are arranged to engage the side chains 5 and 6 as the apron reels pass along in proximity to the window 2 of the casing for the purpose of preventing any tendency of the chains to vibrate at this point. Back side guides 24, 25, are also arranged to engage the chains 5 and 6 for holding them in position. The side guides 22, 24, are supported in position by bars 26, carried by the side frame 4 and the guides 23, 25, are supported in position by bars 27, carried by the side frame 3.

The driving mechanism for the machine is so arranged that any one apron reel will be caused to travel one complete circuit while the support 14 is rotated once. This driving mechanism is constructed, arranged and operated as follows:—A motor of any desired type such, for instance, as an electric motor 28, is mounted within the casing 1 and has its shaft 29 provided with a pinion 30 which meshes with a spur gear 31 fixed to a cross shaft 32 mounted in the side frames 3 and 4 below the picture display apron. This cross shaft 32 has fixed thereto pinions 33, 34, which mesh with spur gears 35, 36, fixed to the stud shafts 12 and 13 respectively. Movement is thus imparted from the motor to the apron reel carrying chains 5 and 6. In the present arrangement it is desired that the shaft 9 to which the rotary support 14 is fixed shall be rotated at half the speed of the stud shafts 12 and 13. This is accomplished by connecting a sprocket wheel 38 fixed to the stud shaft 13 and a sprocket 39 fixed to the cross shaft 9, with a chain 37.

It is to be understood that the surfaces of the aprons which are to be exhibited through the window 2 in the casing may be provided with display designs which may be arranged to coact so as to produce a moving picture effect as the apron reels are moved continuously across the picture plane or that the said aprons may be provided with display designs so arranged as to produce changing picture effects either by moving the said reels continuously across the picture plane or intermittently across the same.

Following the movement of any pair of apron reels it will be seen that as they are moved away from the rotary support 14, the aprons are gradually unwound from the reels in opposite directions against the tension of their springs until the reels reach the lowermost point in their movements. As the reels approach the rotary support 14 in their upward movement, the springs will cause the reels to gradually wind up the aprons. It will thus be seen that the strain due to the increasing tension of the spring of a reel from which an apron is being unwound is counteracted by the decreasing tension of the spring of an opposing reel upon which an apron is being wound.

As has been stated hereinbefore, the support 14 is rotated at the desired speed to complete its rotation at the same moment that any one roll completes its circuit. By mounting the ends of two oppositely rotating reels in one link, it will be seen that there is no tendency on the part of the chain to become distorted by any undue twisting strain on the link. By arranging the reels in oppositely rotating pairs, it will be seen that the friction on the adjacent faces of the aprons will be reduced to a minimum. The use of a rotary support located within the annular series of apron reels forming a common attachment for the outer ends of all of the aprons, permits the repetition of the picture displays without ever reversing the movements of the parts.

What I claim is:—

1. In a picture display machine, a plurality of reels, arranged to travel in a common path, picture display aprons wound thereon and means for moving the reels along said path for displaying different portions of several aprons in the picture plane at the same time.

2. In a picture display machine, a plurality of reels arranged to travel in an endless path, picture display aprons wound thereon and means for moving the reels along said path for displaying different portions of the several aprons in the picture plane at the same time.

3. In a picture display machine, a plurality of reels, picture display aprons wound thereon, means for the attachment of the aprons separate from the reels and means for moving the reels in a common path whereby different surfaces on the aprons are presented during the movement of the reels in said path.

4. In a picture display machine, a plurality of spring actuated reels, picture display aprons wound thereon, means for the attachment of the aprons separate from the reels and means for moving the reels in a common path whereby different surfaces on the aprons are presented during the movement of the reels in said path.

5. In a picture display machine, a plurality of reels arranged to travel in an endless path, picture display aprons wound thereon, means for moving the reels successively into and out of the picture plane and means for the attachment of the aprons eccentric to the path of the reels whereby different surfaces on the aprons are presented during the passage of the reels through the picture plane.

6. In a picture display machine, a plurality of spring actuated reels arranged to travel in an endless path, picture display aprons wound thereon, means for moving the reels successively into and out of the picture plane and means for the attachment of the aprons eccentric to the path of the reels whereby different surfaces on the aprons are presented during the passage of the reels through the picture plane.

7. In a picture display machine, a plurality of reels arranged to travel in an endless path, picture display aprons wound thereon, means for moving the reels successively into and out of the picture plane and a rotary support for the attachment of the aprons, said support being arranged eccentric to the path of the reels whereby different surfaces on the aprons are presented during the passage of the reels through the picture plane.

8. In a picture display machine, a plurality of reels arranged to travel in an endless path, a rotary support arranged eccentric to the path of the reels, picture display aprons wound on said reels and having their outer ends successively attached permanently to the rotary support and means for moving the reels successively into and out of the picture plane.

9. In a picture display machine, a plurality of spring actuated reels arranged to travel in an endless path, a rotary support arranged eccentric to the path of the reels, picture display aprons wound on said reels and having their outer ends successively attached permanently to the rotary support and means for moving the reels successively into and out of the picture plane.

10. In a picture display machine, a plurality of reels arranged to travel in an endless path, a rotary support arranged eccentric to the path of the reels, picture display aprons wound on the reels and successively attached to the rotary support and means for moving the reels successively into and out of the picture plane, the said reels being arranged to complete a circuit during one revolution of the rotary support whereby successive displays may be produced without reversing the movement of the reels.

11. In a picture display machine, a plurality of spring actuated reels, arranged to travel in an endless path, a rotary support arranged eccentric to the path of the reel, picture display aprons successively attached to the rotary support and wound in opposite directions on successive pairs of reels and means for moving the reels successively into and out of the picture plane.

12. In a picture display machine, upper and lower sprocket wheels spaced apart, chains arranged to travel over the sprocket wheels and a series of reels carried by the chains, a rotary support, picture display aprons successively attached to the rotary support and wound onto the said reels and means for driving the chains for moving the reels successively into and out of the picture plane.

13. In a picture display machine, upper and lower sprocket wheels spaced apart, chains arranged to travel over the sprocket wheels, a series of spring actuated reels carried by the chains, a rotary support, picture display aprons successively attached to the support and wound onto said reels and means for driving the chains for moving the reels successively into and out of the picture plane.

14. In a picture display machine, upper and lower sprocket wheels spaced apart, chains arranged to travel over the sprocket wheels, a series of reels carried by the chains, a rotary support, picture display aprons successively attached to the rotary support and wound onto said reels and means for driving the chains for moving the reels successively into and out of the picture plane, the said reels being arranged to complete a circuit during one revolution of the rotary support.

15. In a picture display machine, upper and lower sprocket wheels spaced apart, chains arranged to travel over the sprocket wheels, a series of spring actuated reels carried by the chains, a rotary support, picture display aprons successively attached to the rotary support and wound onto said reels and means for driving the chains for moving the reels successively into and out of the picture plane, the said reels being arranged to complete a circuit during one revolution of the rotary part.

16. In a picture display machine, a plurality of spring actuated reels arranged to travel in an endless path, picture display aprons wound thereon, means for moving the reels along said path and means for the attachment of the aprons eccentric to the path of the reels, the strain due to the increasing tension of the spring of a reel from which an apron is being unwound being counteracted by the decreasing tension of the spring of an opposing reel upon which an apron is being wound.

17. In a picture display machine, a plurality of spring actuated reels arranged to travel in an endless path, picture display aprons wound thereon, means for moving the reels along said path and a rotary support for the attachment of the aprons arranged eccentric to the path of the reels, the strain due to the increasing tension of the spring of a reel from which an apron is being unwound being counteracted by the decreasing tension of the spring of an opposing reel upon which an apron is being wound.

In testimony that I claim the foregoing as my invention I have signed my name in presence of two witnesses, this seventh day of March, 1906.

HIRAM A. FARRAND.

Witnesses:
   FREDK. HAYNES,
   F. GEORGE BARRY.